Nov. 30, 1948. M. WELLS 2,455,325
HEAVY DUTY ELECTRODE HOLDER
Filed Jan. 16, 1946

INVENTOR.
MARTIN WELLS
BY Jesse P. Wham
ATTORNEY

Patented Nov. 30, 1948

2,455,325

UNITED STATES PATENT OFFICE 2,455,325

HEAVY-DUTY ELECTRODE HOLDER

Martin Wells, Los Angeles, Calif.

Application January 16, 1946, Serial No. 641,477

13 Claims. (Cl. 219—8)

My invention relates to holders for welding rod in electric arc welding.

The invention relates in particular to those types of arc welding rod holders wherein the gripping mechanism of the holder body is actuated by rotation of the handle which is connected to the rear end of the body. This type of holder ordinarily has a screw which projects forward from the handle into the body. The rotation of this screw transmits a force to rod clamping parts so that the rod is gripped in a desired position. The clamping means of such rods may consist of a pair of cooperating jaws or may comprise a pin portion at the end of the structure which bears directly against the welding rod and clamps the same against a wall of the body. The actuating mechanism of these rod holders, since it produces a force for accomplishing the gripping of the rod, must also produce a reaction. It is an object of the present invention to utilize this reaction in forming a better electrical contact between the movable parts of the rod holder structure.

It is customary in rod holders of the general type referred to in the foregoing to provide between the handle part of the holder and the body part of the holder electrical contacting surfaces which are held in engagement by resilience of the metal parts. When these metal parts become heated, a large portion of this resilience is lost and therefore the electrical contact between the handle and body parts through which the heavy welding current must flow is diminished, thereby reducing the capacity of the holder. These holders are rated with respect to the amperage or current which they are capable of transmitting through the cooperating parts thereof to the rod which is clamped by the holder. It is an object of my invention to utilize the reaction from the rod gripping force to produce an effective and non-diminishing electrical contact between the rod holder parts, thereby greatly increasing the capacity of the holder without necessity of increasing its weight. I have found that by the use of my invention in a rod holder structure rated at 300 amperes, I have been able to increase the ampere rating to 500 and 600 amperes.

It is an object of the invention to provide an electrode holder wherein the rod clamping effect is accomplished by relative rotation of the body and handle parts, wherein the reaction to the clamping force moves contact elements of one of the holder parts into pressural engagement with the other of the holder parts, thereby producing an electrical contact through which a heavy current will flow without producing overheating of the metal structure of the handle.

A further object of the invention is to provide a welding rod holder of the character set forth in the preceding paragraph having parts which utilize the reaction of the clamping force to move contact members, between the handle and body parts radially, thereby producing an electrical contact under heavy pressure, capable of carrying a heavy current.

A further object of the invention is to provide a rod holder of the character set forth in the preceding paragraph wherein the reaction to the clamping force produces expansion of a part of the holder body into tight engagement with an over-lying metal contact wall forming a part of the handle.

A further object of the invention is to provide a rod holder having a recess at its forward end defined by wall means, there being a screw member extending forwardly from the bottom of this recess into a metal body which has metal, contact-forming segments extending into the recess and has internal threads for engagement with the screw member, the reaction between the threads of the body and the threads of the screw member producing outward movement of the segments so that they will be brought into pressural engagement with the walls defining the recess, thereby producing an electrical contact between the handle and body parts which will carry a heavy current.

Further objects and advantages of the invention may be brought out in the following part of the specification.

Referring to the drawing, which is for illustrative purposes only:

Figure 3:
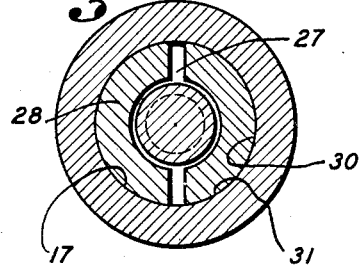
Figure 1:
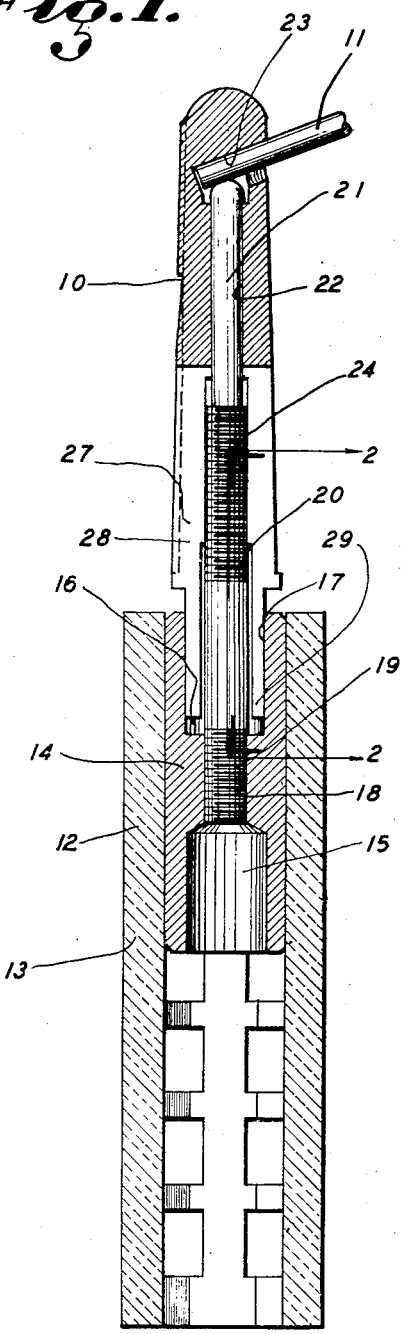
Figure 1 is a sectional view through an embodiment of the invention, having a rod clamping mechanism which includes a pin actuated by the screw member.
Figure 2:
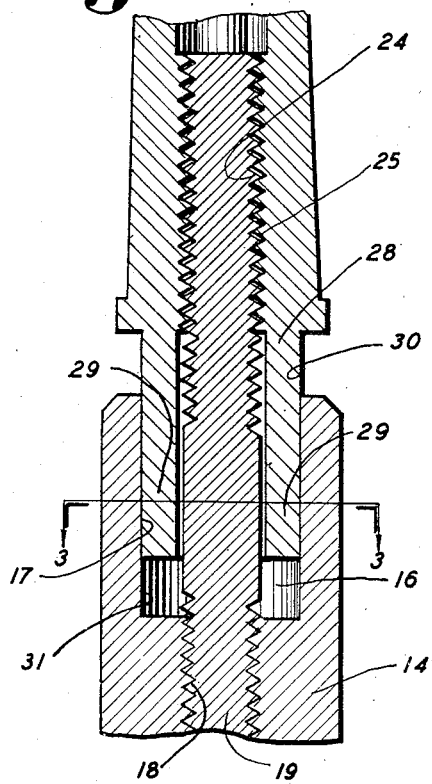
Figure 2 is an enlarged fragmentary section of the contact and threaded portions of the handle and body members; and, Figure 3 is a section taken as indicated by the line 3—3 of Figure 2.

In the form of the invention shown in Figure 1, I provide a body structure or part 10 having means for gripping a welding rod 11, and a handle part 12 which extends rearwardly from the body part 10 and is associated therewith so that it may be rotated relatively to the body part 10 to accomplish the rod gripping effect. The handle part 12 is a composite structure having an insulated, reticulated tubular grip 13 having therein a metal insert 14 preferably of bronze, for the reason that it must have the quality of high electrical conductivity. At the rear end of this insert 14 there is an opening 15 in which the end of an electrical cable is connected to the insert by hard solder, for example. In the front end of the insert 14 there is an opening 16 defined by an annular wall 17, between the openings 15 and 16 the insert has a threaded opening 18 to receive the externally threaded rear end 19 of a screw member 20.

The screw member 20 extends into the body part 10, and at the forward end of the screw member 20 there is a pin or stem 21 which may be formed integrally with the screw member 20. This pin 21 extends through an axial opening 22 in the body part 10, which opening 22 intersects a transverse opening 23 which extends inward from the side of the body part 10, near the front end thereof and preferably at an angle, this opening 23 being referred to as the rod opening into which the rod 11 is extended so that its end will lie in a position to be engaged by the front end of the pin 21.

The screw member 20 has external threads 24 on that portion thereof which projects into the body part 10 and the body part 10 is provided with internal threads 25 for engagement with the threads 24. Accordingly, rotation of the screw member 20 in the body part 10 will produce axial movement of the pin 21 whereby the front end of the pin 21 will clamp the rod 11 which is extended into the opening 23.

The body part 10 has a longitudinal slot 27 extending from its rear end forwardly to a point beyond the front ends of the threads 25 and close to the rear end of the opening 22 which receives the pin 21. The slot 27 divides the rearward portion of the body part 10 into a pair of segments 28 which are of semicircular cross section, and the rearward ends 29 of which project into the opening 16 of the metal insert 14 forming a part of the handle structure, the external faces 30 of the segment parts 29 defining a cylinder of the same size as the cylindrical inner face 31 of the wall 17 of the insert 14 which defines the opening 16.

When the screw member 20 is retracted so that there is no pressure between the threads 24 and 25, there is normally sufficient springiness in the segments 28 to hold the end parts 29 thereof in frictional engagement with the wall 17 of the insert 14. When the rod 11 is placed in the opening 23 and the handle is rotated relatively to the body part 10 so as to advance the pin 21 into engagement with the rod 11 with a clamping force, there will be a reaction of the external threads 24 of the screw member 20 against the internal threads 25 of the segments 28 in axial direction so that the inclined faces of the threads 24 will slide upon the inclined faces of the threads 25, thereby forcing the segments 28 radially outwardly with wedging action so that the end parts 29 of the segments will be forced pressurally against the interior surface 31 of the wall 17, thereby producing a tight and effective electrical contact between the surfaces of the parts 17 and 29 which respectively form parts of the handle and the body of the rod holder which are connected by the screw member 20 in rotatable relation.

The electrical contact between the parts 17 and 29 is positive in its character, and the pressure of engagement between the parts 17 and 29 is such that there will be a large area of surface contact through which a heavy welding current may flow from the metal insert 14 to the body part 10 which is also preferably made from bronze, but may be made of other metal having good electrical conductivity. The electrical contact between the walls 17 and 29 does not depend upon resilience of the engaging parts, as has been the practice in previous electrode holders of this general character, and therefore the effectiveness of the electrical contact cannot be reduced by temperature changes of the metal parts. That is to say, the loss of resilience in metal parts does not affect the contact employed by the holder. By use of the invention, I am now able to make extremely small and light-weight electrode holders capable of carrying heavy current, for example, 600 amperes, previously requiring large and relatively heavy rod holders.

I claim:

1. In an electrode holder, the combination of: a handle having at the front end thereof an opening defined by metal wall means, and means for connecting an electrical conductor to said metal wall means; a screw member projecting forwardly from the bottom of said opening; a metal body having a threaded opening to receive said screw member, said body having rod clamping means thereon actuated by the turning of said screw member in the threads of said opening; metal connecting parts extending from said body into said opening; and means engaging said metal connecting parts and said screw, receiving force from said screw and applying the same to said metal connecting parts to force the same into pressural engagement with said metal wall means of said handle when said screw member actuates said rod clamping means.

2. In an electrode holder, the combination of: a handle having at the front end thereof an opening defined by metal wall means, and means for connecting an electrical conductor to said metal wall means; a screw member projecting forwardly from the bottom of said opening; a metal body structure receiving said screw member, said body structure having rod clamping means actuated by axial pressure exerted by said screw member, and said body having segments projecting into said opening for engagement with said wall means of said handle, said segments having internal threads for engagement and coaction with the external threads of said screw member to expand said segments outwardly into pressural engagement with said wall means of said handle.

3. In an electrode holder, the combination of: a handle having at the front end thereof an opening defined by metal wall means, and means for connecting an electrical conductor to said metal wall means; a screw member projecting forwardly from the bottom of said opening; a metal body structure receiving said screw member, said body structure having rod clamping means actuated by axial pressure exerted by said screw member, and said body having segments projecting into said opening for engagement with said wall means of said handle, at least one of said segments having internal threads for engagement and coaction with the external threads of said screw member in response to axial pressure therebetween to expand said segments outwardly into pressural engagement with said wall means of said handle.

4. In an electrode holder, the combination of: a handle having at the front end thereof an opening defined by metal wall means, and means for connecting an electrical conductor to said metal wall means; a screw member projecting forwardly from the bottom of said opening; a metal body having an opening to receive said screw member, said body having rod clamping means thereon actuated by axial pressure of said screw member to grip a welding rod, said body having its rear end slotted and extending into said opening for engagement with said wall means of said handle, and said slotted rear end of said body having internal threads for engagement and coaction with the threads of said screw member in response to an axial pressure of the threads of said screw member against the threads of said slotted portion to expand the slotted portion into pressural engagement with said wall means of said handle to make effective electrical contact.

5. In an electrode holder, the combination of: a handle having at the front end thereof an opening defined by metal wall means, and means for connecting an electrical conductor to said metal wall means; a screw member projecting forwardly from the bottom of said opening; a metal body having an axial opening to receive said screw member, there being an opening near the forward end of said body intersecting said axial opening, to receive a welding rod; means at the forward end of said screw member to engage and clamp said rod; and segments extending rearwardly from said body into said opening of said handle, said segments having internal threads therein for engagement with the threads of said screw member, the reaction of the threads of said screw member against said internal threads of said segments coacting to move said segments outward into pressural engagement with said wall means of said handle to make an effective electrical connection between said wall means and said body.

6. In an electrode holder of the character described, the combination of: a handle part and a body part having electrical contact forming walls in telescoping relation, said parts being connected together for relative rotation; means associated with said body part operating in response to said rotation to clamp a rod; and means associated with one of said parts actuated by said relative rotation to relatively move said walls into heavy pressural engagement to produce an effective electrical contact between said parts.

7. In an electrode holder of the character described, the combination of: a handle part and a body part having electrical contact forming walls in telescoping relation; screw means connecting said handle part and said body part together for relative rotation, said body part having clamping means for a rod which receives its clamping pressure from said screw means; and means responsive to the reaction effect of said screw means for relatively moving said walls in a radial direction to force them together under pressure and make an effective electrical contact between said parts.

8. In an electrode holder of the character described, the combination of: a handle part and a body part having electrical contact forming walls in telescoping relation; screw means connecting said handle part and said body part together for relative rotation, said body part having clamping means for a rod which receives its clamping pressure from said screw means; and means associated with the inner of said walls actuated in response to the reaction effect of said screw means to expand said inner wall into pressural engagement with the outer of said walls to make an effective electrical contact between said parts.

9. An electrode holder comprising a body part, relatively rotatable means mounted on said body part including a member having a threaded connection with the body part, the threads of said connection coacting to relatively move said member and associated body part in directions to clampingly engage a welding rod and force the threads together with a wedging effect, and relatively movable contact surfaces carried by said body part and said means urged into pressure engagement by said wedging effect to form a current supply connection with said body part.

10. An electrode holder comprising a body part, a member for clamping a welding rod to said body, means for actuating said member rotatably mounted on said body part, said body part and means having relatively movable contact surfaces in sliding engagement constituting an electrical circuit connection to said body, a threaded connection between said member and said body operative upon initial rotation of said means to move said member to clamping position and thereafter act with a wedging action to force said surfaces into pressure contact.

11. An electrode holder comprising a body part, means for clamping a welding rod to said body including an actuating member rotatably mounted on said body part, said body and member having relatively movable contact surfaces in sliding engagement constituting an electrical circuit connection to said body, and a threaded connection between said body and actuating member operative with a wedging action to force said surfaces into pressure contact, when said first means are actuated to clamp the welding rod.

12. An electrode holder comprising a body part, means for clamping a welding rod to said body including an actuating member rotatably mounted on said body part, said body and member having relatively movable contact surfaces in sliding engagement constituting an electrical circuit connection to said body, and wedge means operable by said member to increase the contact pressure between said contact surfaces upon actuation of said first means to a position clamping the welding rod to said body.

13. An electrode holder comprising a body part, means operative to exert a force for clamping a welding rod to said body including an actuating member rotatably mounted on said body part, said body and member having relatively movable contact parts in sliding engagement constituting an electrical circuit connection to said body, and a reaction receiving part between said first named means and one of said contact parts acting in response to the clamping action of said first means for increasing the contact pressure between said contact surfaces.

MARTIN WELLS.

REFERENCES CITED

The following references are of record in the file of this patent:

UNITED STATES PATENTS

| Number | Name | Date |
| --- | --- | --- |
| 2,322,077 | Wells | June 15, 1943 |